(12) United States Patent
Yi et al.

(10) Patent No.: US 8,964,652 B2
(45) Date of Patent: Feb. 24, 2015

(54) METHOD FOR ENHANCING OF CONTROLLING RADIO RESOURCES, METHOD FOR TRANSMITTING STATUS REPORT, AND RECEIVER IN MOBILE COMMUNICATION SYSTEM

(75) Inventors: Seung-June Yi, Gyeonggi-Do (KR); Sung-Jun Park, Gyeonggi-Do (KR); Young-Dae Lee, Gyeonggi-Do (KR); Sung-Duck Chun, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 258 days.

(21) Appl. No.: 12/452,140

(22) PCT Filed: Jun. 18, 2008

(86) PCT No.: PCT/KR2008/003457
§ 371 (c)(1),
(2), (4) Date: Dec. 17, 2009

(87) PCT Pub. No.: WO2008/156301
PCT Pub. Date: Dec. 24, 2008

(65) Prior Publication Data
US 2010/0136995 A1 Jun. 3, 2010

Related U.S. Application Data

(60) Provisional application No. 60/944,785, filed on Jun. 18, 2007.

(30) Foreign Application Priority Data

Jun. 13, 2008 (KR) .................. 10-2008-0055964

(51) Int. Cl.
*H04L 12/28* (2006.01)
*H04L 1/18* (2006.01)
(Continued)

(52) U.S. Cl.
CPC ............ *H04L 1/1832* (2013.01); *H04L 1/1848* (2013.01); *H04W 28/06* (2013.01); *H04W 80/02* (2013.01)

USPC ........ 370/329; 455/452.1; 370/242; 370/349; 370/235; 370/412

(58) Field of Classification Search
CPC ....... H04W 24/00; H04W 28/06; H04L 47/10
USPC ........ 370/229, 242, 349, 235, 412; 455/452.1
See application file for complete search history.

(56) References Cited

U.S. PATENT DOCUMENTS

| 5,588,009 A | 12/1996 | Will |
| 5,894,595 A | 4/1999 | Foladare et al. |

(Continued)

FOREIGN PATENT DOCUMENTS

| CN | 1549612 A | 11/2004 |
| CN | 1751460 A | 3/2006 |

(Continued)

OTHER PUBLICATIONS

Nokia Corporation, Nokia Siemens Networks: "Mac Header Format" 3GPP TSG-RAN WG2 Meeting #59bis; R2-073891; Shanghai, China, Oct. 8-12, 2007, XP-002602993.

(Continued)

*Primary Examiner* — Christopher M Brandt
*Assistant Examiner* — Muthuswamy Manoharan
(74) *Attorney, Agent, or Firm* — McKenna Long & Aldridge LLP

(57) ABSTRACT

A method for improving radio resources, a method for transmitting a status report, and a receiving apparatus (receiver) in a mobile communication system are disclosed. In transmitting a status report by a receiving side RLC, although data that has not been received (missing PDU) is discovered, the receiving side does not immediately request its retransmission but transmits the status report after the lapse of a certain time (namely, a time point at which a timer expires), to thus reduce radio resources consumed for transmission of the status report.

6 Claims, 2 Drawing Sheets

(51) Int. Cl.
*H04W 72/00* (2009.01)
*H04J 3/24* (2006.01)
*H04W 28/06* (2009.01)
*H04W 80/02* (2009.01)

(56) References Cited

U.S. PATENT DOCUMENTS

| | | | |
|---|---|---|---|
| 6,157,833 A | 12/2000 | Lawson-Jenkins et al. | |
| 6,173,057 B1 | 1/2001 | Truong et al. | |
| 6,233,430 B1 | 5/2001 | Helferich | |
| 6,353,628 B1 | 3/2002 | Wallace et al. | |
| 6,725,267 B1 | 4/2004 | Hoang | |
| 6,785,256 B2 | 8/2004 | O'Neil | |
| 6,795,419 B2 | 9/2004 | Parantainen et al. | |
| 7,039,425 B1 | 5/2006 | Mazawa et al. | |
| 7,197,317 B2 | 3/2007 | Parkvall et al. | |
| 7,457,588 B2 | 11/2008 | Love et al. | |
| 7,525,908 B2 * | 4/2009 | Olsson et al. | 370/229 |
| 7,551,643 B2 | 6/2009 | Yeo et al. | |
| 7,606,370 B2 | 10/2009 | Lillie et al. | |
| 7,916,697 B2 | 3/2011 | Eklund | |
| 8,064,676 B2 | 11/2011 | Li et al. | |
| 8,427,997 B2 | 4/2013 | Ren et al. | |
| 8,582,482 B2 | 11/2013 | Hsu | |
| 8,582,487 B2 | 11/2013 | Gou et al. | |
| 8,588,100 B2 | 11/2013 | Wei | |
| 8,599,706 B2 | 12/2013 | Damnjanovic et al. | |
| 8,614,971 B2 | 12/2013 | Kim et al. | |
| 2001/0012787 A1 | 8/2001 | Wortham | |
| 2001/0017850 A1 | 8/2001 | Kalliokulju et al. | |
| 2001/0044322 A1 | 11/2001 | Raaf | |
| 2002/0028690 A1 | 3/2002 | McKenna et al. | |
| 2002/0057663 A1 | 5/2002 | Lim | |
| 2002/0114294 A1 | 8/2002 | Toskala et al. | |
| 2003/0007512 A1 | 1/2003 | Tourunen et al. | |
| 2003/0016698 A1 | 1/2003 | Chang et al. | |
| 2003/0123485 A1 | 7/2003 | Yi et al. | |
| 2003/0125056 A1 | 7/2003 | Jiang | |
| 2003/0139170 A1 | 7/2003 | Heo | |
| 2003/0147371 A1 | 8/2003 | Choi et al. | |
| 2003/0165133 A1 | 9/2003 | Garani | |
| 2003/0189922 A1 | 10/2003 | Howe | |
| 2003/0207696 A1 | 11/2003 | Willenegger et al. | |
| 2003/0223452 A1 | 12/2003 | Toskala et al. | |
| 2003/0227875 A1 | 12/2003 | Wei et al. | |
| 2004/0014452 A1 | 1/2004 | Lim et al. | |
| 2004/0028078 A1 | 2/2004 | Beckmann et al. | |
| 2004/0117860 A1 | 6/2004 | Yi et al. | |
| 2004/0121771 A1 | 6/2004 | Song et al. | |
| 2004/0127265 A1 | 7/2004 | Van Bosch et al. | |
| 2004/0147269 A1 | 7/2004 | Kim | |
| 2004/0176094 A1 | 9/2004 | Kim et al. | |
| 2004/0176112 A1 | 9/2004 | Beckmann et al. | |
| 2004/0202107 A1 | 10/2004 | Bensimon et al. | |
| 2004/0233870 A1 | 11/2004 | Willenegger et al. | |
| 2004/0253959 A1 | 12/2004 | Hwang et al. | |
| 2005/0018624 A1 | 1/2005 | Meier et al. | |
| 2005/0041610 A1 | 2/2005 | Lee et al. | |
| 2005/0041681 A1 | 2/2005 | Lee et al. | |
| 2005/0053029 A1 | 3/2005 | Lee et al. | |
| 2005/0054365 A1 | 3/2005 | Ahn et al. | |
| 2005/0085254 A1 | 4/2005 | Chuah et al. | |
| 2005/0094670 A1 | 5/2005 | Kim | |
| 2005/0100048 A1 * | 5/2005 | Chun et al. | 370/468 |
| 2005/0138528 A1 | 6/2005 | Ameigeiras et al. | |
| 2005/0141462 A1 | 6/2005 | Aerrabotu et al. | |
| 2005/0141471 A1 | 6/2005 | Virtanen et al. | |
| 2005/0141538 A1 | 6/2005 | Beckmann et al. | |
| 2005/0176430 A1 | 8/2005 | Lee et al. | |
| 2005/0180378 A1 | 8/2005 | Lee et al. | |
| 2005/0185620 A1 | 8/2005 | Lee et al. | |
| 2005/0232271 A1 | 10/2005 | Kettunen et al. | |
| 2005/0238051 A1 | 10/2005 | Yi et al. | |
| 2005/0249188 A1 | 11/2005 | Hayashi | |
| 2005/0288022 A1 | 12/2005 | Ryu et al. | |
| 2006/0039309 A1 | 2/2006 | Lee et al. | |
| 2006/0067364 A1 | 3/2006 | Jung et al. | |
| 2006/0087994 A1 | 4/2006 | Barth et al. | |
| 2006/0098567 A1 | 5/2006 | Willenegger et al. | |
| 2006/0142019 A1 | 6/2006 | Kroth et al. | |
| 2006/0165045 A1 | 7/2006 | Kim et al. | |
| 2006/0195540 A1 | 8/2006 | Hamilton et al. | |
| 2006/0209870 A1 | 9/2006 | Lee et al. | |
| 2006/0245417 A1 | 11/2006 | Conner et al. | |
| 2006/0251105 A1 | 11/2006 | Kim et al. | |
| 2007/0024972 A1 | 2/2007 | Kuerz et al. | |
| 2007/0047452 A1 * | 3/2007 | Lohr et al. | 370/242 |
| 2007/0047493 A1 | 3/2007 | Park et al. | |
| 2007/0060139 A1 | 3/2007 | Kim et al. | |
| 2007/0064665 A1 | 3/2007 | Zhang et al. | |
| 2007/0165567 A1 | 7/2007 | Tan et al. | |
| 2007/0206531 A1 | 9/2007 | Pajukoski et al. | |
| 2007/0224993 A1 | 9/2007 | Forsberg | |
| 2007/0248075 A1 | 10/2007 | Liu et al. | |
| 2007/0254595 A1 | 11/2007 | Yoon et al. | |
| 2007/0291646 A1 | 12/2007 | Ohishi et al. | |
| 2007/0291673 A1 | 12/2007 | Demirhan et al. | |
| 2007/0291695 A1 | 12/2007 | Sammour et al. | |
| 2007/0293224 A1 | 12/2007 | Wang et al. | |
| 2008/0056198 A1 | 3/2008 | Charpentier et al. | |
| 2008/0056273 A1 | 3/2008 | Pelletier et al. | |
| 2008/0089285 A1 | 4/2008 | Pirskanen et al. | |
| 2008/0181127 A1 | 7/2008 | Terry et al. | |
| 2008/0259912 A1 | 10/2008 | Want et al. | |
| 2008/0287129 A1 | 11/2008 | Somasundaram et al. | |
| 2009/0005051 A1 | 1/2009 | Voyer et al. | |
| 2009/0034466 A1 * | 2/2009 | Lindskog et al. | 370/329 |
| 2009/0175183 A1 | 7/2009 | Mochizuki et al. | |
| 2010/0061285 A1 | 3/2010 | Maeda et al. | |
| 2010/0075635 A1 | 3/2010 | Lim et al. | |
| 2010/0137016 A1 | 6/2010 | Voyer | |
| 2010/0165901 A1 | 7/2010 | Kim | |
| 2010/0195568 A1 | 8/2010 | Iimori | |
| 2011/0182243 A1 | 7/2011 | Gallagher et al. | |
| 2011/0207427 A1 | 8/2011 | Kitani et al. | |
| 2011/0261743 A1 | 10/2011 | Futaki et al. | |

FOREIGN PATENT DOCUMENTS

| | | |
|---|---|---|
| EP | 0 889 664 | 1/1999 |
| EP | 1 148 735 | 10/2001 |
| EP | 1 148 753 | 10/2001 |
| EP | 1 168 877 | 1/2002 |
| EP | 1 209 938 | 5/2002 |
| EP | 1 304 898 | 4/2003 |
| EP | 1 315 356 | 5/2003 |
| EP | 1315356 A2 | 5/2003 |
| EP | 1 318 632 | 6/2003 |
| EP | 1337124 A2 | 8/2003 |
| EP | 1 372 310 | 12/2003 |
| EP | 1499144 | 1/2005 |
| EP | 1511245 A2 | 3/2005 |
| EP | 1 720 322 A1 | 11/2006 |
| EP | 1 720 373 | 11/2006 |
| EP | 1744577 | 1/2007 |
| EP | 1757135 A1 | 2/2007 |
| EP | 2087653 A1 | 8/2009 |
| JP | 6-6294 A | 1/1994 |
| JP | 2003-087180 A | 3/2003 |
| JP | 2003-235064 A | 8/2003 |
| JP | 2005260906 A | 9/2005 |
| JP | 2005318131 A | 11/2005 |
| JP | 2005-354488 | 12/2005 |
| JP | 2006-067115 | 3/2006 |
| JP | 2009-540721 A | 11/2009 |
| JP | 2009-542100 A | 11/2009 |
| KR | 10-2000-0039404 A | 7/2000 |
| KR | 10-2001-0015234 | 2/2001 |
| KR | 10-2001-0105240 | 11/2001 |
| KR | 10-2002-0001173 A | 1/2002 |
| KR | 10-2002-0014939 A | 2/2002 |
| KR | 10-2003-0005537 A | 1/2003 |
| KR | 10-2003-0026924 | 4/2003 |
| KR | 10-2003-0080165 A | 10/2003 |

(56) References Cited

FOREIGN PATENT DOCUMENTS

| | | |
|---|---|---|
| KR | 10-2003-0093604 | 12/2003 |
| KR | 10-2004-0005834 A | 1/2004 |
| KR | 10-2004-0039944 | 5/2004 |
| KR | 2004-0048675 | 6/2004 |
| KR | 10-2004-0072858 A | 8/2004 |
| KR | 10-2004-0086950 | 10/2004 |
| KR | 10-2005-0008440 | 1/2005 |
| KR | 10-2005-0019560 A | 3/2005 |
| KR | 10-2005-0027972 | 3/2005 |
| KR | 10-2005-0053376 A | 6/2005 |
| KR | 10-2005-0063174 A | 6/2005 |
| KR | 10-2005-0073244 A | 7/2005 |
| KR | 10-0595646 A | 7/2005 |
| KR | 10-2005-0096763 | 10/2005 |
| KR | 10-2005-0100552 | 10/2005 |
| KR | 10-2006-0024756 | 3/2006 |
| KR | 1020060026722 A | 3/2006 |
| KR | 10-2006-0048373 A | 5/2006 |
| KR | 1020060073472 A | 6/2006 |
| KR | 10-2006-0091525 A | 8/2006 |
| KR | 10-2007-0006850 A | 1/2007 |
| KR | 10-2007-0047669 A | 5/2007 |
| RU | 2 249 917 | 4/2005 |
| WO | 9904584 | 1/1999 |
| WO | WO 00/11878 | 3/2000 |
| WO | WO 00/54521 | 9/2000 |
| WO | WO 00/74416 | 12/2000 |
| WO | WO 01/05050 | 1/2001 |
| WO | 0178252 A1 | 10/2001 |
| WO | WO 02/39622 | 5/2002 |
| WO | 02/091659 A2 | 11/2002 |
| WO | 03/100988 | 12/2003 |
| WO | 2004017581 | 2/2004 |
| WO | 2004028050 | 4/2004 |
| WO | WO 2004/043099 | 5/2004 |
| WO | WO 2004/064272 | 7/2004 |
| WO | 2004091246 | 10/2004 |
| WO | 2004102833 A1 | 11/2004 |
| WO | 2004102838 A1 | 11/2004 |
| WO | WO 2005/048613 | 5/2005 |
| WO | 2005/067262 A1 | 7/2005 |
| WO | 2005/074312 A1 | 8/2005 |
| WO | 2005/122616 | 12/2005 |
| WO | 2005/125260 A1 | 12/2005 |
| WO | WO 2006/018670 | 2/2006 |
| WO | 2006/034819 A1 | 4/2006 |
| WO | 2006/049441 A1 | 5/2006 |
| WO | WO 2006/075820 A1 | 7/2006 |
| WO | 2006/108703 A1 | 10/2006 |
| WO | WO 2006/104344 | 10/2006 |
| WO | WO2006/109851 | 10/2006 |
| WO | 2007/025138 A2 | 3/2007 |
| WO | WO 2007/052888 | 5/2007 |
| WO | WO 2007/078155 | 7/2007 |
| WO | WO 2007/078172 | 7/2007 |
| WO | WO 2007-078929 A2 | 7/2007 |
| WO | WO 2007/133034 | 11/2007 |
| WO | WO 2008/042889 A1 | 4/2008 |
| WO | 2008051466 | 5/2008 |
| WO | WO 2008/096984 A1 | 8/2008 |
| WO | 2008/111684 A1 | 9/2008 |
| WO | WO 2009/084998 A1 | 7/2009 |

OTHER PUBLICATIONS

LG Electronics Inc: "Support or VoIP over MAC-hs/ehs"; 3GPP TSG-RAN WG2#57bis; R2-071542; St. Julian's, Malta; Mar. 26-30, 2007, XP-50134474A.
Youjun Gao et al.: "Research on the access network and MAC technique for beyond 3G systems" IEEE Wireless Communications, IEEE Service Center, Piscataway, NJ, US, vol. 14, No. 2, Apr. 1, 2007, pp. 57-61, XP-011184637.
Alcatel-Lucent: "DL Control Signaling and Multiplexing for VoIP" 3GPP TSG RAN WG1 Meeting #48bis; R1-071721; St. Julians, Malta Mar. 26-30, 2007, XP-002460800.

"$3^{rd}$ Generation Partnership Project; Technical Specification Group Radio Access Network; Evolved Universal terrestrial radio Access (E-UTRA) Medium Access Control (MAC) protocol specification (Release 8)", 3GPP Standard; 3GPP TS 36.321, Sophia-Antipolis, France, No. V8.1.0, Mar. 1, 2008, XP050377617.
LG Electronics: "3GPP Draft; UL Timing Control Related to Contention Resolution_R4", $3^{rd}$ Generation Partnership Project (3GPP), Shenzhen, China, Mar. 31-Apr. 4, 2008, R2-081607, XP50139334.
RAN2#54, Tallinn, Estonia, Aug. 28-Sep. 1, 2006, Agenda Item: 11.3.4, Source: IPWireless, Title: Contention Resolution in Non-synchronous RACH Access, Document for: Discussion, R2-062269.
3GPP TSG-RAM WG2 #57, St. Louis, USA, Feb. 15-19, 2007, Agenda Item: 11.4, Source: LG Electronics, Title: Discussion on Message 4 in Random Access, Document for: Discussion and Decision, R2-070519.
3GPP TSG-RAN WG2 #57bis, St. Julian's, Malta, Mar. 26-30, 2007, Agenda Item: 5.4, Source: LG Eelctronics, Title: Discussion on Message 4 in Random Access, Document for: Discussion and Decision, R2-071456.
3GPP TSG-RAN WG2 #58, Kobe, Japan, May 7-11, 2007, Agenda Item: 4.6, Source: LG Electronics, Title: Discussion on Message 4 in Random Access, Document for: Discussion and Decision, R2-071923.
Nokia; "Requirements for redirection in E-UTRAN", 3GPP TSG-RAN WG2 Meeting #56-bis, R2-070107, Jan. 2007.
IPWireless; "Layer 2 functions for LTE", 3GPP TSG RAN WG2 #48bis, R2-052377, Oct. 2005.
Samsung; "Selective forwarding/retransmission during HO", 3GPP TSG-RAN2 Meeting #56bis, R2-070130, Jan. 2007.
Samsung; "Re-use of PDCP SN at ARQ level ?", 3GPP TSG-RAN2 Meeting #53bis, R2-061829, Jun. 2006.
Panasonic; "MAC PDU format for LTE", 3GPP TSG RAN WG2#56bis, R2-070096, Jan. 2007.
LG Electronics Inc.; "Relative Buffer Status Reporting", 3GPP TSG-RAN WG2 meeting #46bis, R2-050852, Apr. 2005.
NTT Docomo et al.: "Mac PDU Structure for LTE" 3GPP Draft; R2-070280, $3^{rd}$ Generation Partnership Project (3GPP), Mobile Competence Centre; 650, Route Des Lucioles; F-06921 Sophia-Antipolis Cedex ; France, vol. Ran WG2, no. Sorrento, Italy; 20070112, Jan. 12, 2007, XP050133369; [retrieved on Jan. 12, 2009].
Catt et al.: "Enhancement to Buffer Status 1-7 Reporting" 3GPP Draft; R2-071345, $3^{rd}$ Generation Partnership Project (3GPP), Mobile Competence Centre; 650, Route Des Lucioles; F-06921 Sophia-Antipolis Cedex; France, vol. Ran Wg2, no. St. Julian; 20070322, Mar. 22, 2007, XP050134291 [retrieved on Mar. 22, 2009].
LG Electronics, "PDCP Retransmissions" R2-073041, XP050135778, 3GPP TSG-RAN WG2 #59. Aug. 19-24, 2007, Athens, Greece.
LG Electronics, "PDCP Structure and Traffic Path" R2-073259, XP050135985, 3GPP TSG-RAN WG2 #59. Aug. 20-24, 2007, Athens, Greece.
LG Electronics, "Contents of PDCP Status Report" R2-07xxxx, XP002580785, 3GPP TSG-RAN WG2 #59. Oct. 8-12, 2007, Shanghai, China.
Bosch: "header compression signalling" 3GPP Draft; Header Compression Signalling, $3^{RD}$ Generation Partnership Project (3GPP), Mobile Competence Centre; vol. RAN WG2, no. Sophia Antipolis, France; 19991129, Nov. 29, 1999, XP050114120.
"$3^{RD}$ Generation Partnership Project; Technical Specification Group radio Access Network; Packet Data Convergence Protocol (PDCP) specification (Release 7)" 3GPP Standard; 3GPP TS 25.323, $3^{RD}$ Generation Partnership Project (3GPP), Mobile Competence Centre; 650, Route Des Lucioles; F-06921 Sophia-Antipolis Cedex; France, No. V7.4.0, Mar. 1, 2007, pp. 1-44, XP050367856.
IP Wireless: "Contention Resolution in Non-synchronous RACH Access", RAN2 #54, Tallinn, Estonia, Aug. 28-Sep. 1, 2006, R2-062269.
Asustek: "Granularity consideration for variable RLC PDE sizes" 3GPP Draft; R2-070336 Granularity Consideration for Variable RLC PDU Sizes, $3^{rd}$ Generation Partnership Project (3GPP), vol. RAN WG2, no. Sorrento, Italy; 20070112, Jan. 12, 2007, XP050133423.

(56) References Cited

OTHER PUBLICATIONS

"3rd Generation Partnership Project; Technical Specification Group Radio Access Network; Medium Access Control (MAC) protocol specification (Release 7)"3GPP Standard; 3GPP TS 25.321, 3rd Generation Partnership Project (3GPP), No. V7.4.0, Mar. 1, 2007, pp. 1-126, XP050367709.

Youjun Gao et al.: "Research on the access network and MAC technique for beyond 3G systems" IEEE Wireless Communications, IEEE Service Center, Piscataway, NJ, US, vol. 14, No. 2, Apr. 1, 2007, pp. 57-61, XP011184637.

"LTE Handover procedures, text proposal", 3GPP Draft; R2-061338 TP for TR 25813 on LTE Handover-FD, 3RD Generation Partnership Project (3GPP), Mobile Competence Centre; 650, Route Des Lucioles; F-06921 Sophia-Antipolis Cedex; France, vol. RAN WG2, no. Shanghai, China; 20060504, May 4, 2006, XP050131278, [retrieved on May 4, 2006] p. 1, lines 7-10, paragraph 2; p. 1, lines 15-16, paragraph 2; p. 1, lines 27-30, paragraph 2; p. 3, lines 6-9.

Samsung: "UL Timing Sync Procedure", Internet Citation, March 27, 2006, XP002434793, Retrieved From the Internet: URL:http://www.3gpp.org/ftp/tsg_ran/wg2_rl2/tsgr2_52/documents/ [Retrieved on May 23, 2007] p. 1, paragraph 1; p. 3, paragraph 2.3; p. 4, lines 5-6, paragraph 3.

R2-063034, "Open Issues in Random Access Procedure", Qualcomm Europe, Oct. 9-13, 2006 (Entirety).

Ericsson, Initial Random Access Procedure for E-UTRAN, 3GPP TSG-RAN WG2 #55, Oct. 9, 2006, R2-062853, URL, http://www.3gpp.org/ftp/tsg_ran/WG2_RL2/TSGR2_55/Documents/R2-062853.zip.

Samsung, LTE Random access procedure, 3GPP TSG RAN2 #54, Aug. 28, 2006, R2-062258, URL, ftp://ftp.3gpp.org/tsg_ran/WG2_RL2/TSGR2_54/Documents/R2-062258.zip.

Siemens, Initial Access Procedure, 3GPP TSG-RAN WG2 LTE AdHoc Meeting, Jun. 27, 2006, R2-061931, URL, ftp://ftp.3gpp.org/tsg_ran/WG2_RL2/TSGR2_AHs/2006_06_LTE/Docs/R2-061931.zip.

Catt, Non-synchronized access and C-RNTI allocation, 3GPP TSG-RAN WG2 #55, Oct. 13, 2006, R2-062933, URL, http://www.3gpp.org/ftp/tsg_ran/WG2_RL2/TSGR2_55/Documents/R2-062933.zip.

Ericsson, "DRX and DTX in LTE_Active," 3GPP TSG-RAN WG2 Meeting#52, R2-060967, Athens, Greece, Mar. 27-31, 2006 (5 pages).

R2-073186: 3GPP TSG RAN WG2 #9 Athens, Greece, Jun. 20-24, 2007 (IP Wireless, NextWave Wireless).

R2-070778: 3GPP TSG-RAN WG2 #57 Feb. 12-16, 2007, Saint-Louis, USA (NTT DoCoMo, Inc.).

R2-080873: 3GPP TSG RAN WG2 #61 Feb. 11-15, Sorrento, Italy (Panasonic).

3GPP TSG-RAN WG2 Meeting #57; Ericsson, "Issues on DRX in LTE Active", R2-070797, Feb. 12-16, 2007.

ZTE: "MAC state transition Document: For Discussion", 3GPP Draft; R2-060064, 3rd Generation Partnership Project (3GPP), Mobile Competence Centre; 650, Route Des Lucioles; F-06921 Sophia-Antipolis Cedex; France, vol. RAN WG2, no. Sophia Antipolis, France; 20060105, Jan. 5, 2006, XP050130225.

"Summary of email discussion on DRX Control", 3GPP Draft; R2-07XXXX DRX Control LTE V6, 3rd Generation Partnership Project (3GPP), Mobile Competence Centre; 650, Route Des Lucioles; F-06921 Sophia-Antipolis Cedex; France, Mar. 23, 2007, XP050602959.

Nokia: "Active Mode DRX", 3GPP Draft; R2-062752 Active Mode DRX, 3rd Generation Partnership Project (3GPP), Mobile Competence Centre; 650, Route Des Lucioles; F-06921 Sophia-Antipolis Cedex; France, vol. RAN WG2, no. Seoul, Korea; 20061005, Oct. 5, 2006, XP050132285.

Email Rapporteur (Nokia): "DRX in E-Utran", 3GPP Draft; R2-070463 DRX In Eutran, 3rd Generation Partnership Project (3GPP), Mobile Competence Centre; 650, Route Des Lucioles; F-06921 Sophia-Antipolis Cedex; France, vol. RAN WG2, no. St. Louis, USA; 20070209, Feb. 9, 2007, XP050133530.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Radio interface protocal aspects (Release 7)." 3GPP TR 25.813 v0.6.0, Mar. 2006.

Ericsson "DRX and DTX in LTE Active." TSG-RAN WG2 Meeting #52, Athens, Greece, Mar. 2006.

Ericsson: "Initial, Random Access and Identity Handling", 3GPP Draft; R2-060592, 3rd Generation Partnership Project (3GPP), Mobile Competence Centre; 650, Route Des Lucioles; F-06921 Sophia-Antipolis Cedex; France, vol. RAN WG2, no. Denver, USA; 20060209, Feb. 9, 2006, XP050130549.

Samsung, Contention resolution in a RACH, 3GPP TSG-RAN WG2#57bis R2-071386, Mar. 30, 2007.

TD Tech, Contention Resolution and Initial Random Access, 3GPP TSG-RAN WG2#57 R2-070910, Feb. 19, 2007.

IPWireless, Initial Access Procedure and C-RNTI Allocation, 3GPP TSG-R AN WG2#56bis R2-070301, Jan. 19, 2007.

IPWireless, Contention Resolution in Non-synchronous RACH Access, 3GPP TSG-RAN WG2#54 R2-062269, Sep. 1, 2006.

R2-061986, "Initial access procedure", LG Electronics, Jun. 27-30, 2006.

"ARQ Operation and HARQ." Siemens; 3GPP TSG-RAN WG2#55; Seoul, South Korea, Oct. 9-13, 2006; R2-062843.

"DRX in E-UTRAN." Email Rapporteur (Nokia); 3GPP TSG-RAN WG2 Meeting #57; R2-070463; St.Louis, USA Feb. 12-16, 2007.

"Active Mode DRX." Nokia; 3GPP TSG-RAN WG2 Meeting #55; R2-062752; Seoul, Korea; Oct. 9-13, 2006.

"DRX Scheme." LG Electronics; 3GPP TSG-RAN WG2 #56; R2-063248; Nov. 6-10, 2006; Riga, Latvia.

"Fast setup for PS services (Cell PCH & URA PCH)." NEC; 3GPP TSG-RAN2 Meeting #53; Tdoc R2-061124; Shanghai, China; May 8-12, 2006.

R2-063397: 3GPP TSG-RAN WG2 #56, Riga, Latvia Nov. 6-10, 2006, NT DoCoMo, Inc. "Views on DRX/DTX control in LTE".

R2-062753: Meeting #55, Seoul Korea Oct. 9-13, 2006, Nokia "Active mode DRX details".

R2-070096: 3GPP TSG RAN WG2#56bis Jan. 15-19, 2007, Sorrento, Italy title "MAC PDU format for LTE".

R2-050852: 3GPP TSG-RAN WG2 meeting #46bis Apr. 4-8, 2005 Beijing China title "Relative Buffer Status Reporting".

Nokia: "RACH reporting", 3GPP Draft; 24A000008, 3rd Generation Partnership Project (3GPP), Mobile Competence Centre ; 650, Route Des Lucioles ; F-06921 Sophia-Antipolis Cedex ; France, vol. RAN WG2, no. Sophia Antipolis,France; 20001110, Nov. 10, 2000, XP050141261, [retrieved on Nov. 10, 2000] UE in Cell_PCH using DRX; p. 1.

Ericsson: "Issues on DRX in LTE Active", 3GPP Draft; R2-070797, 3rd Generation Partnership Project (3GPP), Mobile Competence Centre ; 650, Route Des Lucioles ; F-06921 Sophia-Ntipolis Cedex; France, vol. RAN WG2, no. St. Louis, USA; 20070209, Feb. 9, 2007, XP050133822, [retrieved on Feb. 9, 2007].

"DRX operations for connected mode UEs in LTE",3GPP Draft; R2-063120 DRX for Connected UE, 3rd Generation Partnership Project (3GPP), Mobile Competence Centre ; 650, Route Des Lucioles ; F-06921Sophia-Antipolis Cedex ; France, vol. RAN WG2, no. Riga, Latvia; 20061101, Nov. 1, 2006, XP050132629, [retrieved on Nov. 1, 2006].

R2-070096: 3GPP TSG RAN WG2#56bis—Jan. 15-19, 2007, Sorrento, Italy, Panasonic; MAC PDU Format for LTE.

R2-050852: 3GPP TSG RAN WG2 meeting#46bis—Apr. 4-9, 2005, Beijing China, LG Electronics Inc.; Relative Buffer Status Reporting.

\* cited by examiner

METHOD FOR ENHANCING OF CONTROLLING RADIO RESOURCES, METHOD FOR TRANSMITTING STATUS REPORT, AND RECEIVER IN MOBILE COMMUNICATION SYSTEM

This application claims the benefit of PCT/KR 2008/003457, filed on Jun. 18, 2008, along with U.S. Provisional Application Ser. Nos. 60/944,785, filed Jun. 18, 2007 and Korean Patent Application No. 10-2008-0055964, filed Jun. 13, 2008, all of which are hereby incorporated herein by reference for all purposes in their entireties

TECHNICAL FIELD

The present invention relates to a radio protocol of a mobile telecommunications system and, more particularly, to a method for enhancing of controlling radio resources, a method for transmitting a status report, and a receiving apparatus in an Evolved Universal Mobile Telecommunications System (E-UMTS) that has been evolved from a UMTS.

BACKGROUND ART

FIG. 1 is a network structure of an LTE (Long Term Evolution) system, the related art mobile communication system. For the LTE system, which has evolved from the existing UMTS system, basic standardizations are ongoing in the 3GPP.

An LTE network can be divided into an E-UTRAN (Evolved UMTS Terrestrial Radio Access Network) and a CN (Core Network). The E-UTRAN includes a terminal (or UE (User Equipment)), a base station (eNB (Evolved Node B)), and an access gateway (aGW). The access gateway may be divided into a part that handles processing of user traffic and a part that handles control traffic. In this case, the access gateway part that processes the user traffic and the access gateway part that processes the control traffic may communicate with a new interface. One or more cells may exist in a single eNB. An interface may be used for transmitting user traffic or control traffic between eNBs. The CN may include the access gateway and a node or the like for user registration of the UE. An interface for discriminating the E-UTRAN and the CN may be used.

FIG. 2 shows an exemplary structure of a control plane of a radio interface protocol between the UE and the E-UTRAN based on the 3GPP radio access network standards. FIG. 3 shows an exemplary structure of a user plane of the radio interface protocol between the UE and the E-UTRAN based on the 3GPP radio access network standards.

The structure of the radio interface protocol between the UE and the E-UTRAN will now be described with reference to FIGS. 2 and 3.

The radio interface protocol has horizontal layers comprising a physical layer, a data link layer, and a network layer, and has vertical planes comprising a user plane (U-plane) for transmitting user data information and a control plane (C-plane) for transmitting control signals. The protocol layers in FIGS. 2 and 3 can be classified into a first layer (L1), a second layer (L2), and a third layer (L3) based on three lower layers of an open system interconnection (OSI) standard model widely known in the communication system. The radio protocol layers exist as pairs between the UE and the E-UTRAN and handle a data transmission in a radio interface.

The layers of the radio protocol control plane of FIG. 2 and those of the radio protocol user plane of FIG. 3 will be described as follows.

The physical layer, the first layer, provides an information transfer service to an upper layer by using a physical channel. The physical layer is connected to an upper layer called a medium access control (MAC) layer via a transport channel. Data is transferred between the MAC layer and the physical layer via the transport channel. The transport channel is divided into a dedicated transport channel and a common channel according to whether or not a channel is shared. Between different physical layers, namely, between a physical layer of a transmitting side and that of a receiving side, data is transmitted via the physical channel.

The second layer includes various layers. First, a medium access control (MAC) layer performs mapping various logical channels to various transport channels and performs logical channel multiplexing by mapping several logical channels to a single transport channel. The MAC layer is connected an upper layer called a radio link control (RLC) layer by a logical channel. The logical channel is divided into a control channel that transmits information of the control plane and a traffic channel that transmits information of the user plane according to a type of transmitted information.

An RLC (Radio Resource Control) layer, the second layer, segments and/or concatenates data received from an upper layer to adjust the data size so as for a lower layer to suitably transmit the data to a radio interface. In addition, in order to guarantee various QoSs (Quality of services) required by each radio bearer RB, the RLC layer provides three operational modes: a TM (Transparent Mode); a UM (Unacknowledged Mode); and an AM (Acknowledged Mode). In particular, the RLC layer (referred to as an 'AM RLC layer', hereinafter) operating in the AM performs a retransmission function through an automatic repeat and request (ARQ) function for a reliable data transmission.

A packet data convergence protocol (PDCP) layer of the second layer performs a function called header compression that reduces the size of a header of an IP packet, which is relatively large and includes unnecessary control information, in order to effectively transmit the IP packet such as an IPv4 or IPv6 in a radio interface having a narrow bandwidth. The header compression increases a transmission efficiency between radio interfaces by allowing the head part of the data to transmit only the essential information.

The RRC layer located at the lowermost portion of the third layer is defined only in the control plane, and controls a logical channel, a transport channel and a physical channel in relation to configuration, reconfiguration, and the release of radio bearers (RBs). In this case, the RBs refer to a logical path provided by the first and second layers of the radio protocol for data transmission between the UE and the UTRAN. In general, configuration (or establishment) of the RB refers to the process of stipulating the characteristics of a radio protocol layer and a channel required for providing a particular data service, and setting the respective detailed parameters and operational methods.

Hereinafter, the RLC layer will be explained in more detail. As afore-mentioned, the RLC layer operates in three modes, TM, UM, and AM. Since the RLC layer performs a simple a function in the TM, only the UM and AM will be explained.

The UM RLC generates each PDU with a PDU header including a Sequence Number (SN), thereby allowing a receiving side to know which PDU has been lost while being transmitted. Accordingly, the UM RLC transmits broadcast/multicast data or transmits real-time packet data such as voice (e.g., VoIP) of a Packet Service domain (PS domain) or streaming on a user plane. Also, on a control plane, the UM RLC transmits, to a specific terminal or specific terminal group in a cell, an RRC message requiring no response for reception acknowledgement.

Like the UM RLC, the AM RLC generates each PDU with a PDU header including a Sequence Number (SN). Differently from the UM RLC, in the AM RLC, a receiving side performs acknowledgement for PDUs transmitted from a sending side. In the AM RLC, the reason why the receiving side performs acknowledgement is to request the sending side to retransmit a PDU if the receiving side fails to receive the PDU. The re-transmission function is the main characteristic part of the AM RLC. The AM RLC aims to guarantee error-free data transmission using the re-transmission function. To this end, the AM RLC handles transmission of non-real time packet data such as TCP/IP of PS domain in the user plane, and transmits an RRC message that necessarily requires a reception acknowledgement among RRC message transmitted to a specific terminal in a cell in the control plane.

In terms of directionality, the UM RLC is used for uni-directional communications, while the AM RLC is used for bi-directional communications due to feedback from the receiving side. The UM RLC is different from the AM RLC in the aspect of configuration. The UM RLC and the AM RLC are different in terms of structural aspect: the UM RLC is that a single RLC entity has only one structure of transmission or reception but the AM RLC is that both a sending side and a receiving side exist in a single RLC entity.

The AM RLC is complicated due to its re-transmission function for data. The AM RLC is provided with a retransmission buffer as well as a transmission/reception buffer for retransmission management. The AM RLC performs many functions, e.g., usage of a transmission/reception window for flow control, polling to request a status information (status report) from a receiving side of a peer RLC entity by a sending side, a receiving side's status report informing about its buffer status to a sending side of a peer RLC entity, and generating of a status PDU to transmit status information, or the like.

In order to support those functions, the AM RLC requires various protocol parameters, status variables, and timers.

The PDUs used for controlling data transmission in the AM RLC such as the status report or a status PDU are called control PDUs, and PDUs used for transferring user data are called data PDUs.

A data loss may occur in a physical channel in all mobile telecommunications systems. Although the probability that data is not properly transferred from a sending side to a receiving side at a physical layer is much lower in an Evolved Universal Terrestrial Radio Access Network (E-UTRAN) than in the related art systems, but the probability of a data loss in the E-UTRAN is not completely 'zero'. Especially, as terminals become away from a base station, they have an increasing data loss rate. Thus, important signaling data or TCP data required to be transmitted without an error should be managed with a more special care. To this end, the aforementioned Acknowledged Mode (AM) is used.

In using the AM, if a receiving side fails to receive data, the receiving side should quickly inform a sending side accordingly. If time taken for the receiving side to recognize a data reception error and inform the sending side about the error is shortened, time taken for correcting the error would be shortened and also time taken for transmission failure of user data would be shortened, enhancing user's satisfaction. Thus, on an RLC layer, the receiving side informs the sending side about its buffer status and requests retransmission of data that has not been received through an RLC status report.

In this respect, however, if the RLC receiving side transmits the status report whenever it detects missing data, radio resources would be wasted. The RLC status report is transmitted through an RLC status PDU, so because the RLC status PDU is also an RLC PDU, the RLC status report consumes a certain amount of radio resources when transmitted.

Thus, a mechanism that may allow an RLC status report to be transmitted not too late and consume not too much radio resource is required.

DISCLOSURE OF INVENTION

Technical Solution

Therefore, it is an object of the present invention to provide a method for configuring a new L2 protocol in a Long Term Evolution (LTE) system that transmits a newly defined RLC status report.

To achieve these and other advantages and in accordance with the purpose of the present invention, as embodied and broadly described herein, there is provided a method for transmitting a status report in a mobile communication system, including: (A) when a receiving side receives a PDU (Protocol Data Units) from a sending side out of sequence, starting, by thea receiving side, a timer at a lower edge of a reception window when the receiving side receives a PDU (Protocol Data Unit) from a sending side out of sequence,; and (B) if the timer expires in a state that a PDU corresponding to the lower edge of the reception window is not received yet, transmitting, by the receiving side, to the sending side, a status report including information about PDUs which have not been received until the expiration of the timer, to the sending side if the timer expires in a state that a PDU corresponding to the lower edge of the reception window is not received.

In step (A), if the PDU is received from the sending side out of sequence and no timer is active, the timer is start.

The method for transmitting a status report may further include: stopping timer if the PDU corresponding to the lower edge of the reception window is received before the timer expires; and delivering the received PDU and/or the following in-sequence PDU to an upper layer.

The method for transmitting a status report may further include: shifting, by the receiving side, the reception window such that the lower edge of the reception window corresponds to the first PDU which has not been received, after the received PDU and/or the following in-sequence PDU are delivered to the upper layer; checking whether there is any PDU stored in the shifted reception window; and re-starting the timer with respect to the lower edge of the shifted reception window if there is a PDU stored in the reception window.

The step (B) may further include: re-starting the timer with respect to the lower edge of the reception window after the status report is transmitted to the receiving side as the timer expires.

The receiving side may be a network, the receiving side may be a terminal, and the steps (A) and (B) may be performed by an RLC (Radio Link Control) entity of the terminal.

The value of time period of the timer is determined by the sending side and transmitted to the receiving side.

To achieve the above object, there is also provided an apparatus including: a reception buffer that stores PDUs transmitted by a sending side; a timer that operates during a pre-set time period if there is a PDU which has not been received at a lower edge of a reception window; and a processing unit that sets the reception window, determines whether there is a PDU which has not been received among the PDUs that have been received by the reception window, by using an SNs (Sequence Numbers) of the PDUs, and starts the timer for the lower edge of the reception window for which there exists the first PDU which has not been received.

If the corresponding PDU for which the timer was started has not been received at a time point when the timer expires, the processing unit transmits a status report including information about missing PDUs that have not been received at the time point when the timer expires, to the sending side.

The PDU that has not been received is a missing PDU.

The present invention is advantageous in that if certain data is not received, the data is not immediately requested to be re-transmitted but after a certain time lapses, several data that have not been received are collected and requested to be retransmitted, to thus reduce radio resources consumed for the request for retransmission.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description, and serve to explain the principles of the invention.

In the drawings.

MODE FOR THE INVENTION

Figure 1:
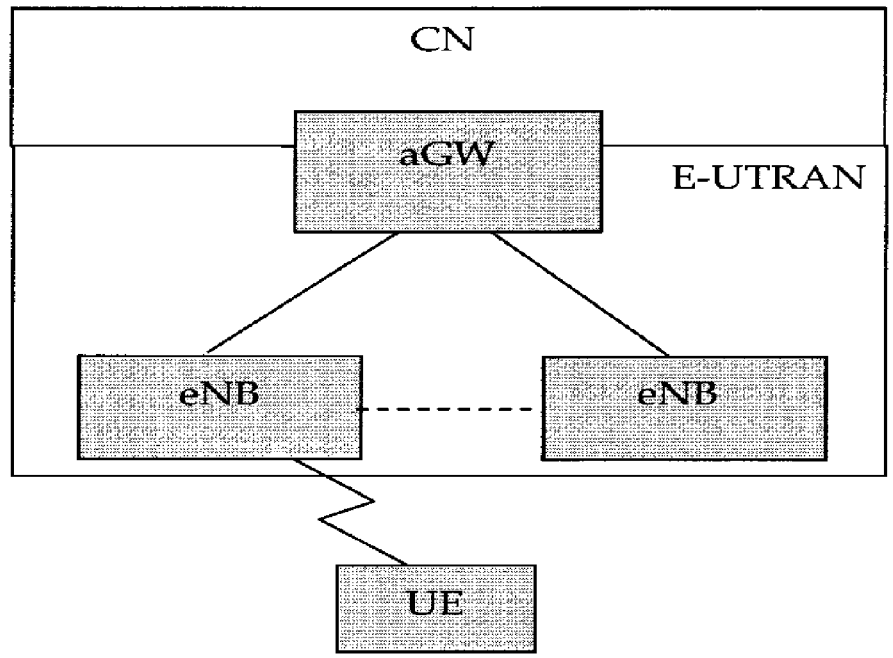
FIG. 1 shows a network structure of a Long Term Evolution (LTE), the related art mobile communication system.
Figure 2:
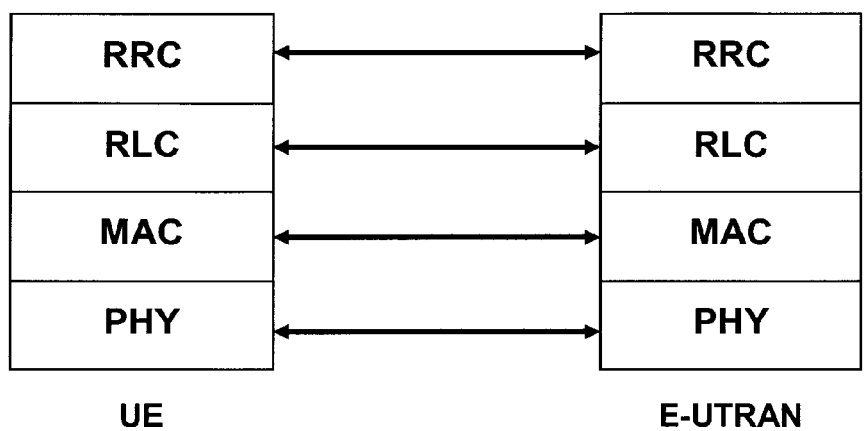
FIG. 2 shows the architecture of a control plane a radio interface protocol between a terminal and an Evolved-UMTS Terrestrial Radio Access Network (E-UTRAN) based on 3GPP radio access network standards.
Figure 3:
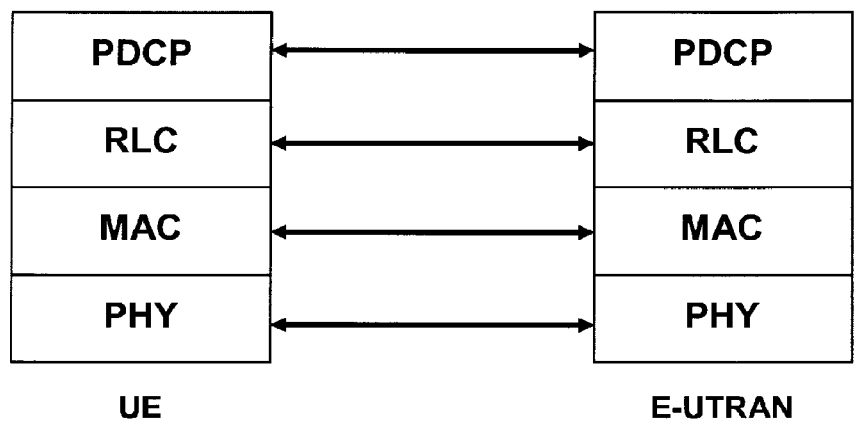
FIG. 3 shows the architecture of a user plane of the radio interface protocol between a terminal and an Evolved-UMTS Terrestrial Radio Access Network (E-UTRAN) based on 3GPP radio access network standards.

Reference will now be made in detail to the preferred embodiments of the present invention, examples of which are illustrated in the accompanying drawings.

The present invention is applied to a mobile telecommunications system and, more particularly, to an Evolved Universal Mobile Telecommunications System (E-UMTS) that has evolved from UMTS. However, without being limited thereto, the present invention may be also applied to any mobile telecommunications system and communication protocol to which technical features of the present invention is applicable.

Thus, a basic concept of the present invention is that 1) if data that has not been received (referred to as 'missing 'PDU', hereinafter) is detected by a receiving side (i.e., a terminal) RLC entity, 2) the missing data is not immediately requested to be retransmitted but a status report with respect to status information about data that have not been received is transmitted after a certain period of time, 3) to thus reduce radio resources consumed for transmission of the status report.

In order to implement such concept of the present invention, the receiving side RLC includes a timer, and if particular conditions (i.e., timer starting conditions) are met, the timer is started, and then if particular conditions (i.e., timer stopping conditions) are met, the started (activated) timer is stopped. If the stopping conditions are not met until the timer expires, a status report is transmitted to a sending side (i.e., a network) RLC. Thereafter, if the particular conditions (i.e., the timer starting conditions) are met, the timer is re-started.

Here, the operation method of the RLC and the report transmission conditions vary depending on the starting conditions and stopping conditions of the timer, and the present invention proposes timer starting and stopping conditions as follows. Preferably, one timer is activated at a time.

The timer starting conditions will now be described.

First, a certain RLC PDU is received out of sequence.

Second, there should be no timer being currently active.

If the timer starting conditions are met and a timer is started, the timer is started for a PDU corresponding to a lower edge of the reception window.

The stopping conditions of the timer will now be described.

When a corresponding PDU, for which the timer has been started, namely, a PDU, which corresponds to a lower edge of the reception window, is received, the timer is stopped. When the timer is stopped, the PDU for which the timer was started and the following PDU are delivered to an upper layer. The lower edge of the reception window is shifted to a PDU that has not been firstly received after the successive PDUs. If a PDU is not delivered to the upper layer but continuously stored in a reception buffer, a timer is re-started for the PDU corresponding to the lower edge of the shifted reception window.

The operation when the timer expires will now be described.

If the timer stopping conditions are not met until the timer expires, the receiving side RLC configures a status report including information about PDUs that have not been received and transmits the status report to the sending side RLC. And then, the receiving side RLC re-starts the timer for a PDU corresponding to the lower edge of the reception window.

The operation of the receiving side RLC according to the timer starting and stopping conditions and operations will now be described in detail.

eNB RRC (network or sending side) decides the value of a missing PDU timer and informs a terminal RRC (i.e., UE RRC) accordingly. Here, the value of the missing PDU timer refers to a value of time period during which the timer operates for the PDU corresponding to the lower edge of the reception window (namely, the first missing PDU in the reception window). The eNB refers to an entity of a network, namely, a base station. The eNB RRC is an RRC layer of the base station, the sending side. The terminal RRC is an RRC layer of the terminal, the receiving side.

The UE RRC configures a UE RLC with "Expiry of a missing PDU timer" trigger for status reporting, and informs UE RLC about the value of the missing PDU timer.

Upon reception of a RLC PDU, the receiving side RLC entity shall perform the following operations:

1) If the RLC PDU is received in sequence, the RLC PDU is delivered to the upper layer, and then, all the following in-sequence RLC PDUs are delivered to the upper layer. If there is any remaining PDU in the reception buffer, the lower edge of the reception window is set to the first missing PDU in the reception buffer. If, however, there is no remaining PDU in the reception buffer, the lower edge of the reception window is set (shifted) to the next PDU expected to be received.

2) If the RLC PDU is received out-of-sequence, the RLC PDU is stored in the reception buffer at the position indicated by its RLC sequence number. If there is no active missing PDU timer, a missing PDU timer is started for the lower edge of the reception buffer.

Upon reception of an RLC PDU whose sequence number is the same as the lower edge of the reception window, the receiving side RLC entity performs the following operation:

1) The missing PDU timer is stopped.
2) The RLC PDU is delivered to the upper layer
3) All the following in-sequence RLC PDUs are delivered to the upper layer.
4) If there is any remaining PDU in the reception buffer, the lower edge of the reception window is set to the first missing PDU in the reception buffer. And, the missing PDU timer is re-started for the lower edge of the reception window.
5) Meanwhile, if there is no remaining PDU in the reception buffer, the lower edge of the reception window is set (shifted) to the next PDU expected to be received.

Upon expiry of the missing PDU timer, the receiving side RLC entity transmits a status report to the sending side RLC entity. In this case, the status report includes information about a missing PDU (namely, reception-failed PDU). And, the missing PDU timer is re-started for the lower edge of the reception window.

The operation of the timer will now be described in detail with reference to FIGS. 4 and 5.

Figure 4:
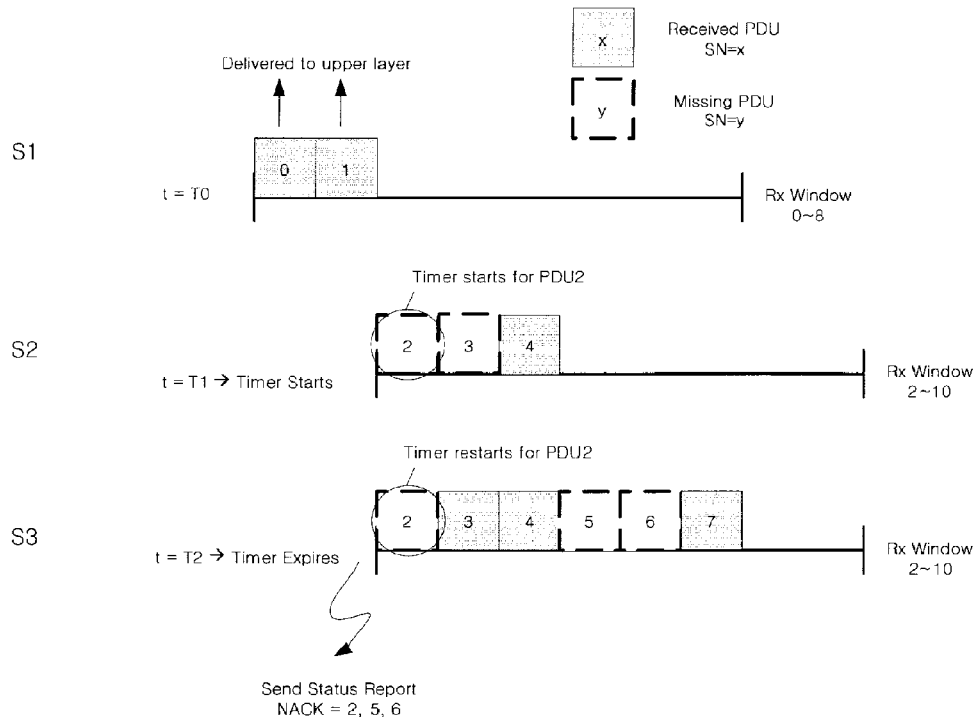
FIG. 4 is a block diagram showing a method of transmitting a status report by a receiving side to a sending side as a timer expires according to an embodiment of the present invention.

FIG. 4 is a block diagram showing a method of transmitting a status report by a receiving side to a sending side as a timer expires according to an embodiment of the present invention.

With reference to FIG. 4, the size of the reception window is 8. At a time point of t=T0, the lower edge of the reception window is positioned at 0 and a upper edge of the reception window is positioned at 8. The embodiment of FIG. 4 will be described according to divisional time points of t=T0 (S1), t=T1 (S2), and t=T2 (S3).

First, at the time point t=T0, the reception window is positioned from 0 to 8. In this case, when the receiving side receives PDU0 and PDU1 in sequence, they are delivered to the upper layer in sequence (S1). Thereafter, the reception window is shifted to 2~10.

Second, PDU4 is received at a time point of t=T1. In this case, because PDU2 and PDU3 have not been received yet, PDU4 is not delivered to the upper layer but stored in the reception buffer. Because there is no active timer (namely, a missing PDU timer) at this time point, the receiving side RLC starts the timer for PDU2, the lower edge of the reception window (S2). In this case, the timer operates by a pre-set time period.

Third, the timer expires at the time point of t=T2. PDU3 and PDU7 have been further received until the timer expires. Meanwhile, PDU2, PDU5 and PDU6 have not been received from the time point at which the timer was started to be driven (i.e., t=T1) to the time point at which the timer has expired (i.e., t=T2). Thus, the receiving side configures a status report based on the reception failure information with respect to the reception-failed data (namely, PDU2, PDU5 and PDU6) and transmits the status report to the sending side (S3). Namely, when the timer expires, the receiving side sends the status report including information (i.e., NACK information) about the reception-failed data (i.e., the missing PDUs) at the time point. And then, the receiving side re-starts the timer for the PDU2, the lower edge of the reception window.

Figure 5:
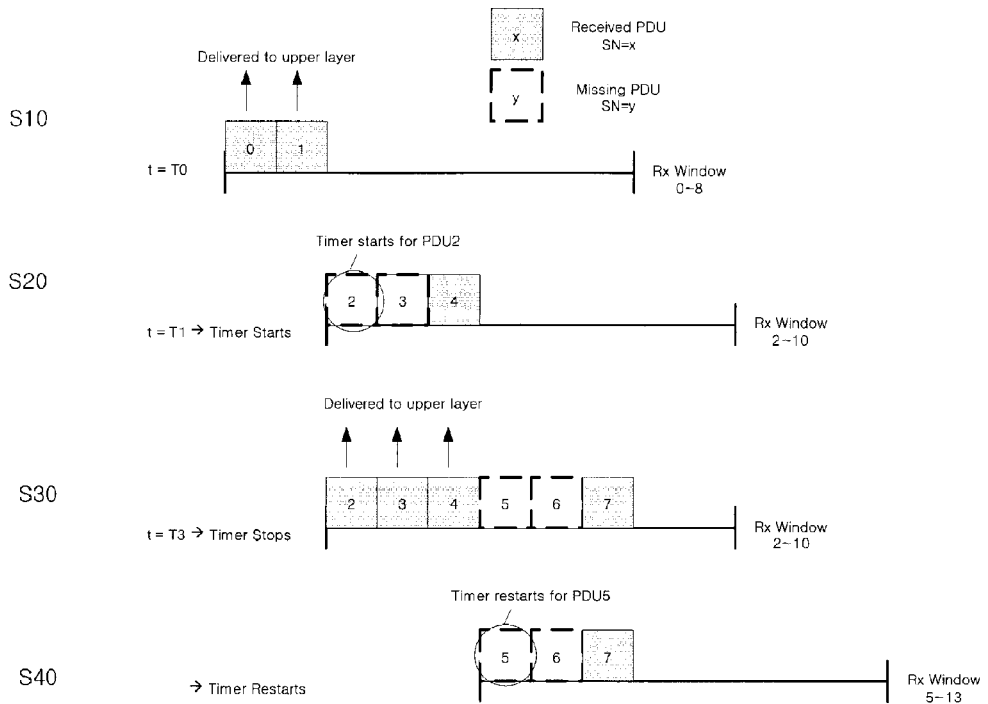
FIG. 5 is a block diagram showing a method of stopping a timer as a PDU, for which the timer has been started, is received according to an embodiment of the present invention.

FIG. 5 is a block diagram showing a method of stopping a timer as a PDU, for which the timer has been started, is received according to an embodiment of the present invention.

With reference to FIG. 5, the size of the reception window is 8. Based on a time point of t=T0, the lower edge of the reception window is positioned at 0 and a upper edge of the reception window is positioned at 8. The embodiment of FIG. 4 will be described by dividing time period into time points of t=T0 (S10), t=T1 (S20), t=T3 (S30), and a time point (S40) following t=T3.

As shown in FIG. 5, PDU2 and PDU3 have not been received at the time point t=T1, so the timer is started for the lower edge of the reception point, namely, for PDU2. And, PDU2, PDU3 and PDU7 are received at a particular time point (t=T3 in FIG. 5) before the started timer expires. The operation of the receiving side RLC at each time point will now be described.

1) At the time point of t=T0, the reception window is positioned at 0 to 8. In this case, if PDU0 and PDU1 are received by the receiving side in sequence, they are delivered to the upper layer in sequence (S10). Thereafter, the reception window is shifted to 2~10.

2) PDU4 is received at the time point of t=T1. In this case, because PDU2 and PDU3 have not been received, the PDU4 is not delivered to the upper layer but stored in the reception buffer. At this point, because there is no active timer (namely, a missing PDU timer), the receiving side RLC starts the timer for PDU2, the lower edge of the reception window (S20). In this case, the timer operates by a pre-set time.

3) PDU2, PDU3 and PDU7 are received at the time point of t=T3. Because PDU2 for which the timer was started has been received, the receiving side RLC stops the operation of the timer. The PDU2 is delivered as an in-sequence PDU to the upper layer, and the following PDU3 and PDU4 are also delivered to the upper layer (S30).

4) The reception window is shifted such that the lower edge is positioned at PDU5, which has not been firstly received. Because there is PDU (PDU7) stored in the reception buffer, the timer is re-started for the PDU5, the lower edge of the reception window (S40).

A receiving apparatus (or a receiver) according to the present invention will now be described.

The receiving apparatus according to the present invention includes hardware, software, a module having software, and the like that can implement the embodiments of FIGS. 4 and 5. The apparatus according to the present invention may be called an entity, and the apparatus according to the present invention may be a terminal.

The apparatus according to the present invention includes: a reception buffer that stores PDUs transmitted by a sending side; a timer that operates for a pre-set time if there is a missing PDU at a lower edge of a reception window; and a processing unit that sets the reception window, determines whether there is a missing PDU among the PDUs received by the reception window by using an SN of the PDU, and starts the timer for the lower edge of the reception window where there is a first missing PDU.

If the PDU for which the timer was started is not received at a time point when the timer expires, the processing unit transmits a status report including information about missing PDUs which have not been received to the sending side at the expiry time.

In addition, when the PDU for which the timer was started is received at the time point when the timer expires, the processing unit delivers the received PDU and the following in-sequence PDU to the upper layer.

As described above, the receiving apparatus according to the present invention basically includes software, hardware required for implementing the technical idea of the present invention, in addition to the above-described elements, such as an output unit (display, speaker, or the like), an input unit (keypad, microphone, and the like), a memory, a transmission/reception unit (RF module, antenna, and the like). Such elements are obvious to the person in the art, so description for them will be omitted.

The method described so far may be implemented by software, hardware or their combination. For example, the method according to the present invention may be stored in a storage medium (e.g., an internal memory of a mobile terminal, a flash memory, a hard disk, or the like), and may be implemented by codes or command languages in a software program that can be executed by a processor (e.g., an internal microprocessor of a mobile terminal).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A method for transmitting a status report in a mobile communication system, comprising:
   detecting, at a receiving side, a missing PDU by detecting receipt of an out of sequence PDU from a sending side;
   starting a timer and waiting to send a status report related to the detection until a time of expiration of the timer, wherein the timer is started at a lower edge of a reception window, the lower edge of the reception window corresponding to the missing PDU;
   storing received PDUs in a reception buffer during pendency of the timer;
   determining if the missing PDU is received during the pendency of the timer; and
   if, upon expiration of the timer, the missing PDU is not received, configuring the status report including information about the missing PDU and all other PDUs that have not been received during pendency of the timer, and transmitting, by the receiving side, to the sending side, the status report; and
   if the missing PDU is received during the pendency of the timer:
   stopping the timer;
   delivering the received PDU and any following in-sequence PDU(s) in the reception buffer to an upper layer;
   shifting, by the receiving side, the reception window such that the lower edge of the reception window corresponds to the first PDU which has not been received, wherein shifting occurs after the received PDU and any following in-sequence PDU(s) in the reception buffer are delivered to the upper layer;
   checking whether there is any PDU stored in the reception buffer in the shifted reception window; and
   re-starting the timer with respect to the lower edge of the shifted reception window if there is a PDU stored in the reception window in the shifted reception window.

2. The method of claim 1, wherein the sending side is a network, the receiving side is a terminal, and the method of claim 1 is performed by an RLC (Radio Link Control) entity of the terminal.

3. The method of claim 1, wherein a value of a period of time measured by the timer is determined by the sending side and transmitted to the receiving side.

4. The method of claim 1, wherein upon detection of the missing PDU the receiving side does not immediately request retransmission of the missing PDU.

5. The method of claim 1, wherein determining if the missing PDU is received during the pendency of the timer is accomplished using Sequence Numbers (SNs) of received PDUs.

6. An apparatus comprising:
   a reception buffer configured to store PDUs transmitted by a sending side;
   a timer; and
   a processing unit configured to:
   detect, at a receiving side, a missing PDU by detecting receipt of an out-of-sequence PDU from the sending side;
   start the timer and wait to send a status report related to the detection until a time of expiration of the timer, wherein the timer is started at a lower edge of a reception window, the lower edge of the reception window corresponding to the missing PDU;
   store received PDUs in the reception buffer during pendency of the timer;
   determine if the missing PDU is received during the pendency of the timer; and
   if, upon expiration of the timer, the missing PDU is not received:
   configure the status report including information about the missing PDU and all other PDUs that have not been received during pendency of the timer, and
   transmit, by the receiving side, to the sending side, the status report; and
   if the missing PDU is received during the pendency of the timer:
   stop the timer;
   deliver the received PDU and any following in-sequence PDU(s) in the reception buffer to an upper layer;
   shift, by the receiving side, the reception window such that the lower edge of the reception window corresponds to the first PDU which has not been received, wherein shifting occurs after the received PDU and any following in-sequence PDU(s) in the reception buffer are delivered to the upper layer;
   check whether there is any PDU stored in the reception buffer in the shifted reception window; and
   re-start the timer with respect to the lower edge of the shifted reception window if there is a PDU stored in the reception window in the shifted reception window.

* * * * *